(12) United States Patent
McLaughlin et al.

(10) Patent No.: US 6,189,969 B1
(45) Date of Patent: Feb. 20, 2001

(54) VEHICLE SEAT ADAPTED TO PROTECT OCCUPANT FROM INJURY IN REAR END COLLISION

(76) Inventors: Jay McLaughlin, 1098 Savage St., Southington, CT (US) 06489; Walter T. Ackermann, 159 Fern Hill Rd., Watertown, CT (US) 06795

( * ) Notice: Under 35 U.S.C. 154(b), the term of this patent shall be extended for 0 days.

(21) Appl. No.: 09/363,618

(22) Filed: Jul. 30, 1999

Related U.S. Application Data

(60) Provisional application No. 60/093,799, filed on Jul. 23, 1998.

(51) Int. Cl.[7] ............................. B60N 2/42; B60R 21/055
(52) U.S. Cl. ............................ 297/216.14; 297/216.13; 297/216.1; 297/391
(58) Field of Search ......................... 297/216.14, 216.1, 297/216.13, 284.6, 391

(56) References Cited

U.S. PATENT DOCUMENTS

| | | | | |
|---|---|---|---|---|
| 5,669,661 | * | 9/1997 | Pajon | 297/216.13 |
| 5,782,529 | * | 7/1998 | Miller, III et al. | 297/216.13 |
| 5,833,312 | * | 10/1998 | Lenz | 297/216.13 X |
| 5,902,010 | * | 5/1999 | Cuevas | 297/216.13 |
| 6,030,036 | * | 2/2000 | Fohl | 297/216.14 |

* cited by examiner

Primary Examiner—Peter M. Cuomo
Assistant Examiner—Rodney B. White
(74) Attorney, Agent, or Firm—Dallett Hoopes

(57) ABSTRACT

Seat back rapidly deflates on occurrence of a rear end impact to permit upper torso of vehicle occupant to sink into the seat rather than be propelled forward. This permits his head to meet the headrest. Particulate material in headrest absorbs energy.

6 Claims, 6 Drawing Sheets

IMPACT

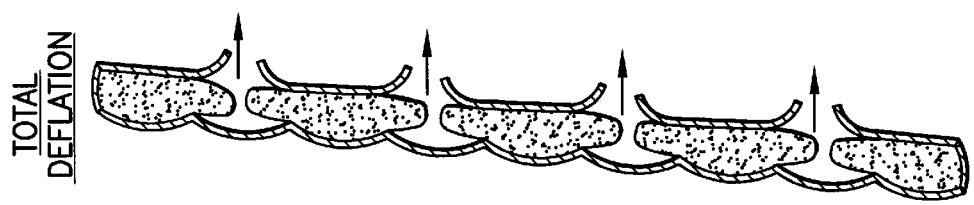
FIG. 8c TOTAL DEFLATION
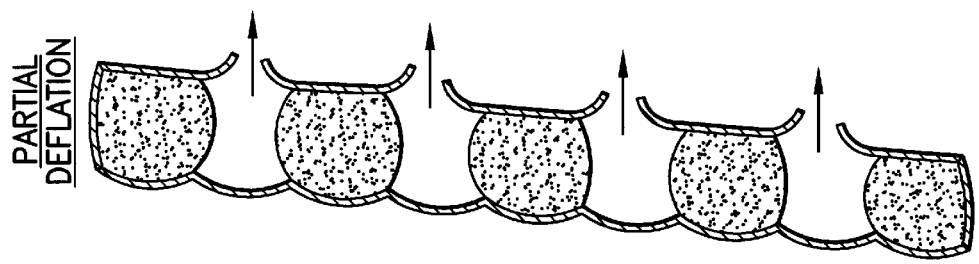
FIG. 8b PARTIAL DEFLATION
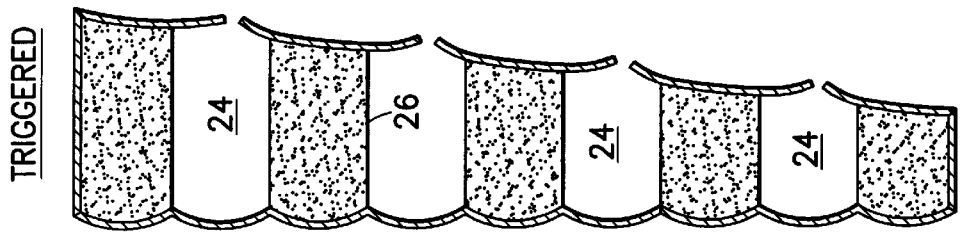
FIG. 8a TRIGGERED
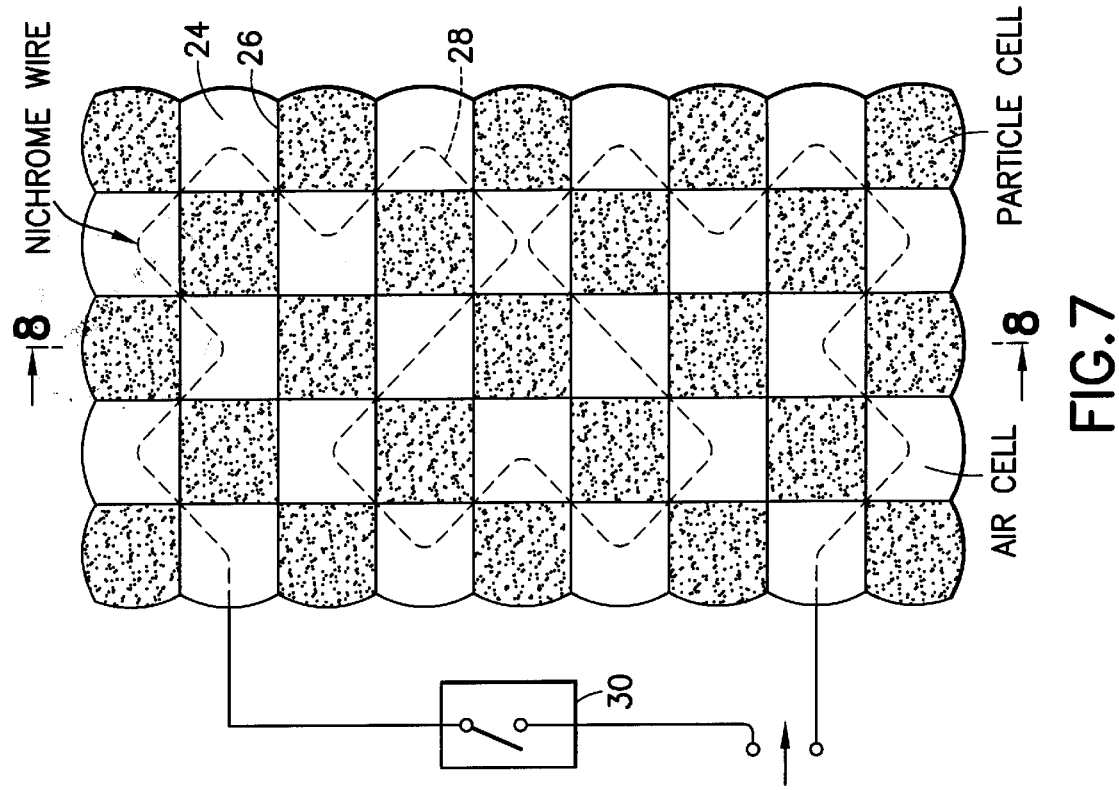
FIG. 7

VEHICLE SEAT ADAPTED TO PROTECT OCCUPANT FROM INJURY IN REAR END COLLISION

REFERENCE TO RELATED APPLICATIONS

This application is related to the provisional application Ser. No. 60/093,799 filed Jul. 23, 1998.

FIELD OF THE INVENTION

This invention relates to a vehicle safety seat assembly. More specifically, the invention relates to such an assembly having means to prevent whiplash injuries.

BACKGROUND OF THE INVENTION

A significant number of auto accidents involve one vehicle colliding into the rear of another at relatively low velocities. The passengers in the rear car are subjected to the sudden deceleration resulting from a front end collision, and are protected by belts, bags, and compliant steering wheels. On the other hand, the impacted vehicle is accelerated forward, subjecting the passengers to impact forces to their backs and heads. In this collision mode, the seat back and headrest are supposed to restrain the passenger and absorb the impact energy.

An objective of the invention is to prevent relative horizontal motion between the passenger's upper body and head during the collision process.

A further objective is to absorb the energy of impact between the head and the headrest by means of entropic heat generation.

SUMMARY OF THE INVENTION

The invention is a vehicle safety seat assembly comprising a seat portion, a backrest portion and a headrest portion, the backrest including a frame secured to the seat portion and having an upper portion defined by a cover portion adapted to be engaged by the shoulders and upper torso of a vehicle occupant and a pressurized bladder or bag disposed between the frame and the cover portion and supporting the occupant away from the frame to a given level. The headrest is secured to the frame and positioned above the backrest, the headrest having a cover adapted to be engaged by the head of an occupant, the cover being at a level away from the frame less far toward the occupant than the cover of the backrest so that the head of the occupant is normally spaced from the headrest. The invention also comprises a rear end collision detecting means, and means activated by the detecting means for promptly evacuating the pressure in the bag.

The evacuation reduces the level of the backrest to the same level as the cover of the headrest to avoid injury to the neck of the occupant.

BRIEF DESCRIPTION OF THE DRAWINGS

Further objects and features of the invention will be clear to those skilled in the art from a review of the following specification and drawings, all of which present a non-limiting form of the invention. In the drawings:

FIG. 7 is a front elevation of a seat back embodying the invention and showing the deflating wire in phantom;

FIGS. 8a, 8b and 8c are sectional views taken on the line 8—8 of FIG. 7 as the seat back progressively deflates.

DESCRIPTION OF THE PREFERRED EMBODIMENT

Figure 3:
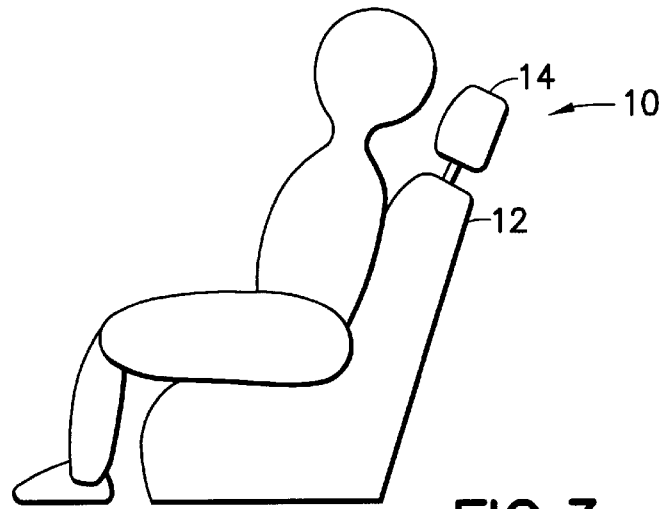
FIG. 3 is a side elevation showing the rider sitting on a seat embodying the invention.
Figure 4:
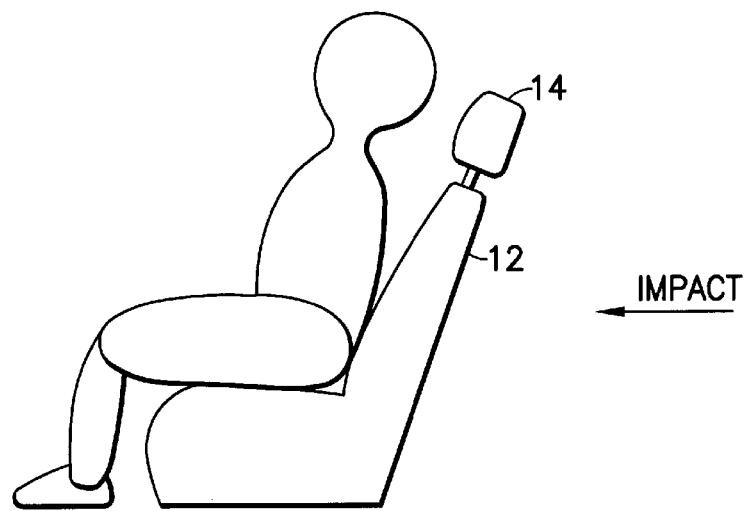
FIG. 4 is a side elevation showing the seat upon deflation at an instant after collision.
Figure 5:
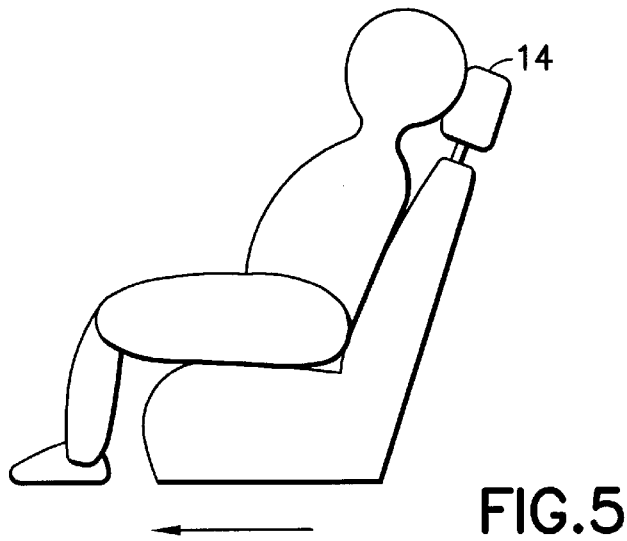
FIG. 5 is a side elevation showing the rider's back and head sinking back against the deflated seat.

An embodiment of a vehicle seat embodying the invention is shown in FIG. 3 and generally designated 10 and comprises a seat back 12 and headrest 14.

Figure 6:
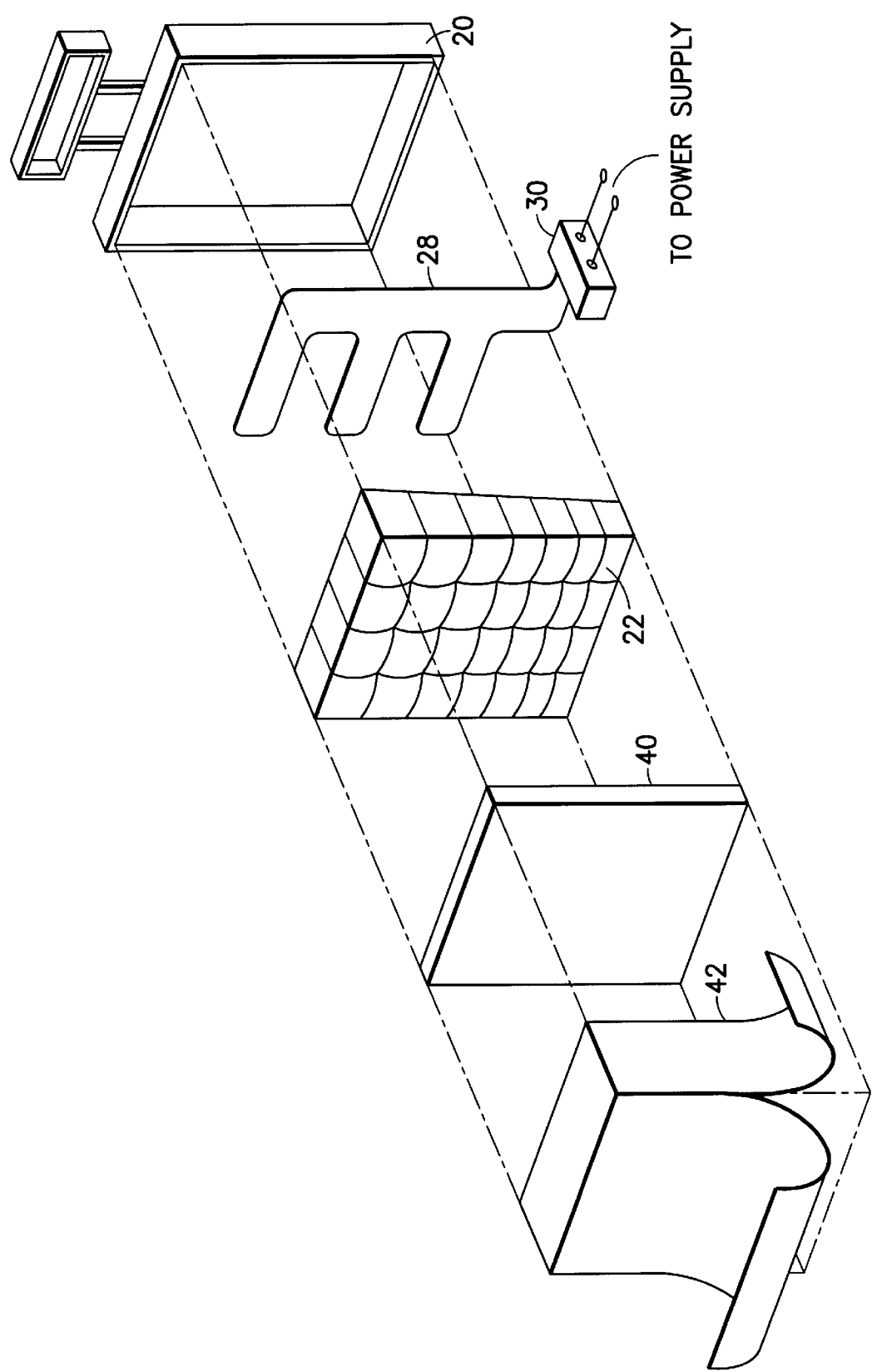
FIG. 6 is an exploded perspective view showing the structure of a seat back embodying the invention.

As shown in FIG. 6, the seat back comprises metal supporting frame 20. Supported by the frame is an air bladder 22 having separate cells 24 defined by transverse walls 26. The proposed air bladder, or bag, has an interconnected cellular construction so that it can be inflated after insertion into the seat back, and has cell walls 26 that connect the front to the back in order to retain its shape. Preferably, the bladder is tapered having greater thickness at the top, approximately 3", than at the bottom (FIG. 6).

A number of means for suddenly deflating the bladder are envisioned. One involves a nichrome heating wire 28 which is attached to the rear side of the bladder so that it passes through all the individual cells. This is shown schematically in FIG. 7. A suitable "g" trigger switch 30 containing a time fuse (not shown) is connected in series with the wire to a power source. Upon an impact above some pre-determined "g" threshold, the switch closes, causing a current to flow through the fuse and wire, bringing the wire to a white heat in milliseconds. This melts slits into the cells, releasing the trapped air. The fuse melts slightly later, opening the circuit.

As shown in FIG. 6, the seat assembly also comprises a thin layer of batting 40 and suitable upholstery covering 42.

Figure 9A:
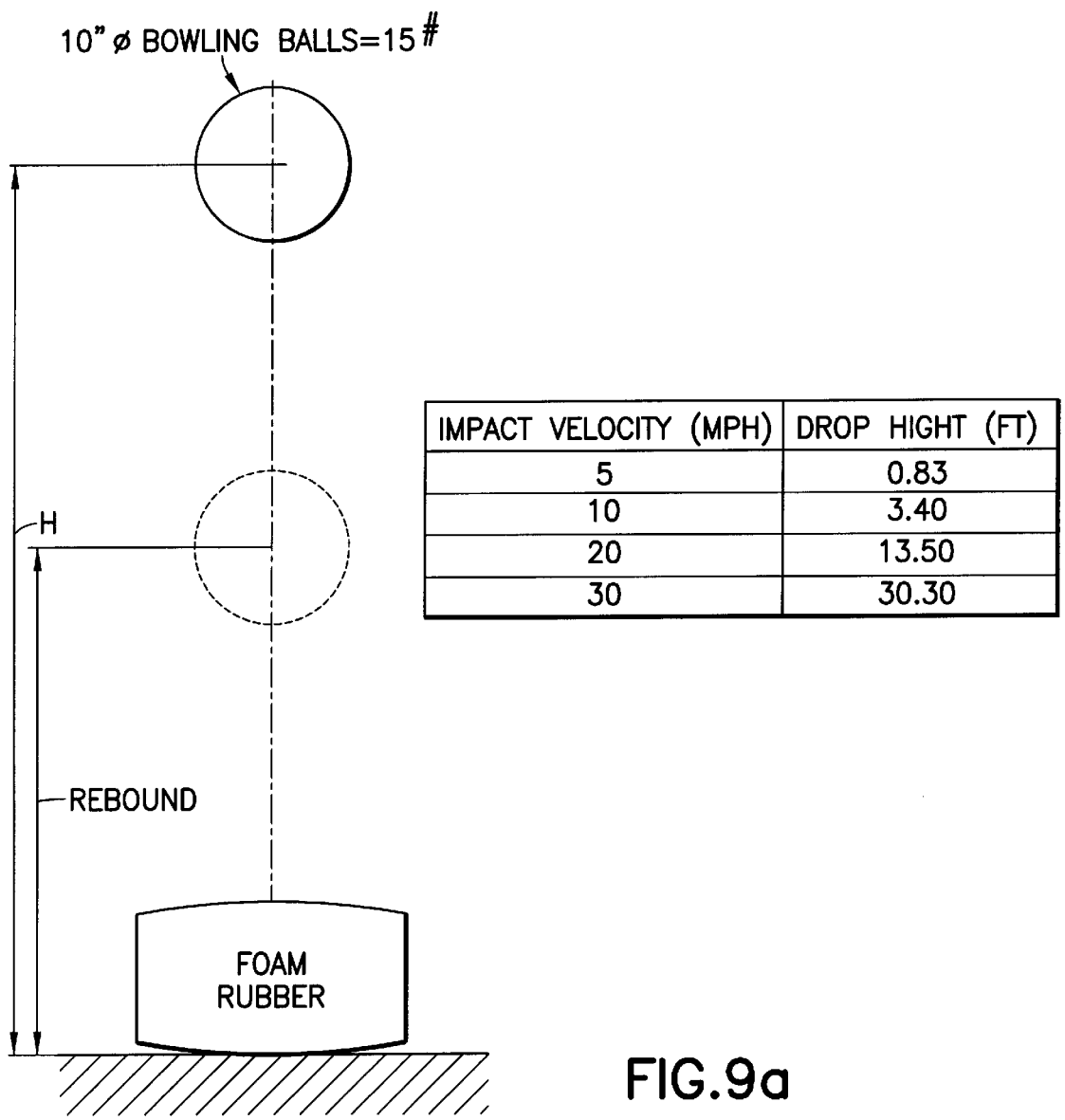
FIGS. 9a and 9b are schematic views comparing the bounce of an object having the approximate size and weight of a human head onto foam rubber or buckwheat husks respectively.
Figure 9B:
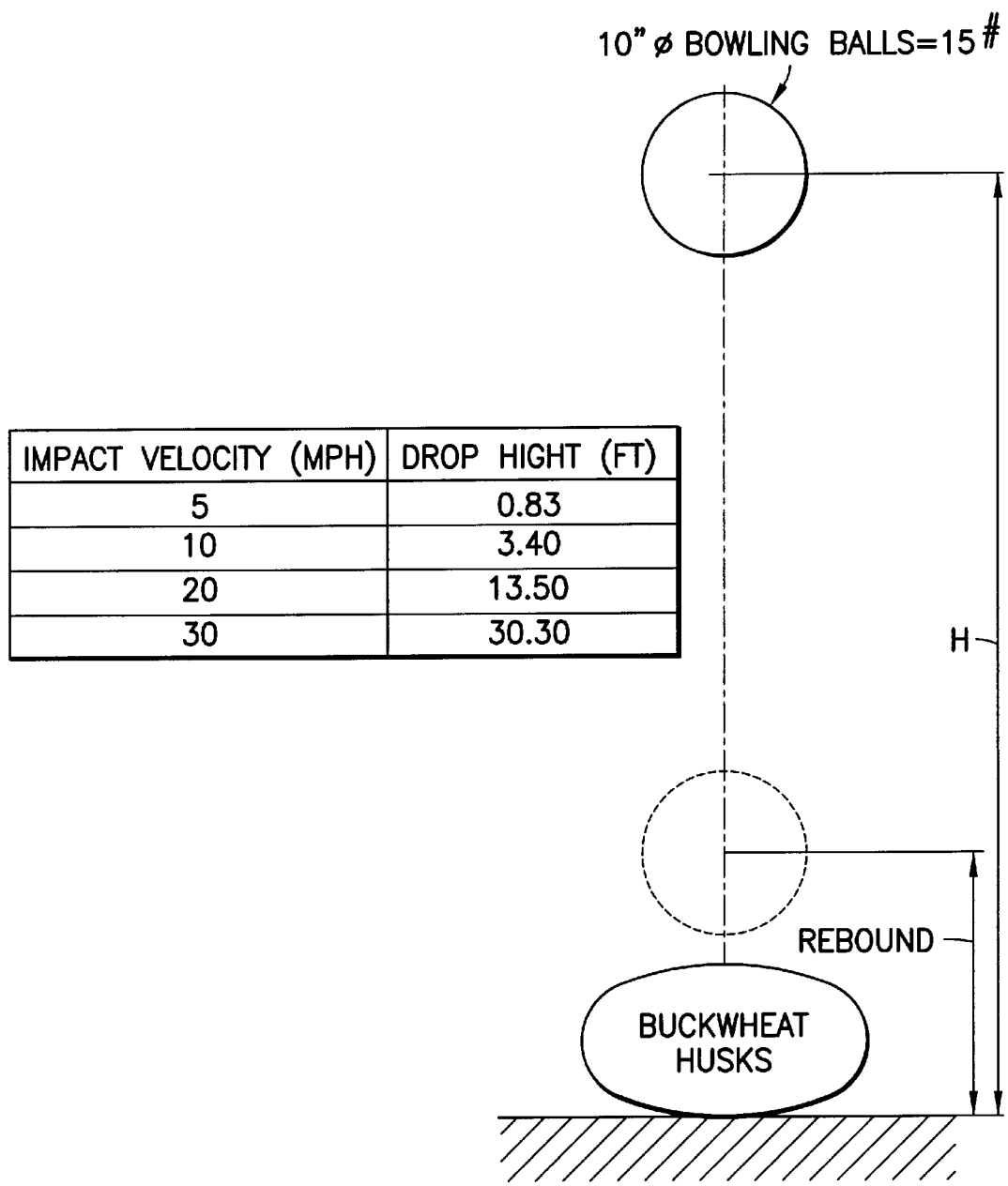

The headrest 14 consists of an upholstery fabric cover, a metal frame, and is filled with particulate. More specifically, the headrest is filled with particulate such as buckwheat husks or irregular plastic particles. FIGS. 9a and 9b demonstrate the difference in the bounce of an object when landing on a sack filled with buckwheat husks as opposed to foam rubber as is often used for headrests. In some cases it is necessary to create compartments within the structure to prevent the particulate from sagging towards the bottom.

In any case, upon impact by the head after the backrest reduces, the headrest deforms into the shape of the back and partial sides of the passenger's head, and in so doing, the particulate has to shear, generating heat due to friction. This heat represents dynamic energy converted into entropic thermal energy. Depending on the design, it may be possible to reuse the headrest without any service.

Figure 1:
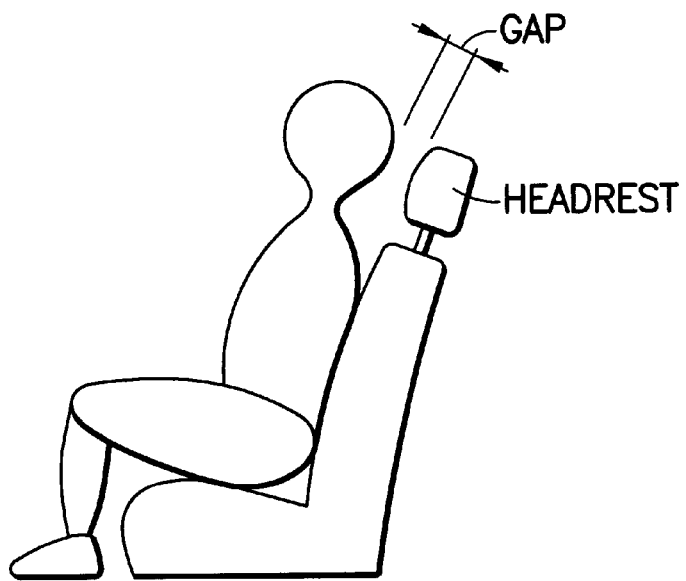
FIG. 1 is a side elevation showing schematically the rider sitting in a conventional vehicle seat.
Figure 2:
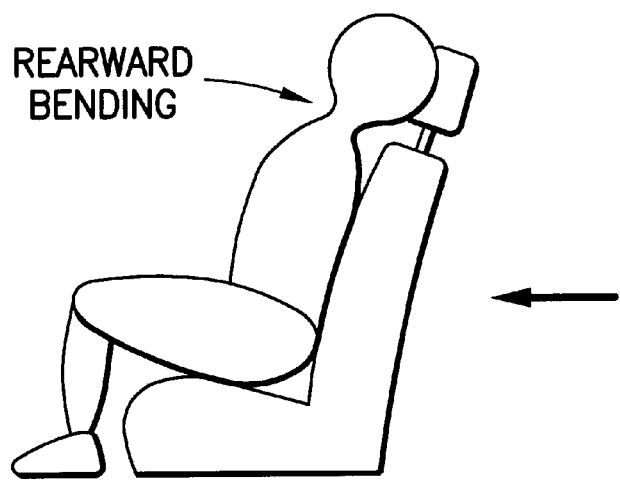
FIG. 2 is a side elevation showing the rider's head thrown back against the headrest in a rear end collision in a conventional vehicle seat.

It is important to understand that the air bladder in the seat back and the particulate in the headrest work in concert to prevent arching of the neck and rebound of the head. If the gap (FIG. 1) between the head and the headrest is normally 2", the bladder should deflate to a higher value, perhaps 3". This difference allows the head to deform the headrest 1" before the upper body bottoms out on the deflated seat back.

The head may continue to further deform the headrest, but the difference will bend the neck to a much smaller degree when compared to many back and seat rests in use today.

A variation of the backrest structure of FIG. 6 involves filling alternate cells with particulate (FIG. 7) similar to that suggested for the headrest. Upon triggering, the air cells comprising the bladder will collapse, allowing the particulate-filled cells to flatten, thus absorbing some of the upper body impact energy. There are many other schemes that could accomplish the same result, i.e., allowing the backrest to collapse rapidly and yet provide some energy absorption when the upper body bottoms out.

In another embodiment, the headrest itself contains an air bladder. The bladder can be suddenly deflated upon engagement of the head with the headrest, after deflation of the backrest.

The seat back can be so designed to allow the bladder and associated trigger system to be readily replaced, or the entire back can be replaced.

While this invention has been disclosed in limited embodiments, it is not so limited but is of a scope defined by the following claim language which may be broadened by an extension of the right to exclude others from making, using or selling the invention as is appropriate under the doctrine of equivalents.

What is claimed is:

1. A vehicle safety seat assembly comprising:
   a. a seat portion,
   b. a backrest including a frame secured to the seat portion and having an upper portion defined by a cover portion adapted to be engaged by the shoulders and upper torso of a vehicle occupant and a pressurized bladder disposed between the frame and the cover portion and supporting the occupant away from the frame to a given level,
   c. a headrest secured to the frame and positioned above the backrest, the headrest having a cover adapted to be engaged by the head of an occupant, the cover of the headrest being closer to the frame than the cover so that the head of the occupant is normally spaced from the headrest,
   d. rear end collision detecting means, and
   e. means activated by the detecting means for promptly evacuating the pressure in the bladder, the evacuation thereby reducing the level of the cover of the backrest to the same level as the cover of the headrest to avoid injury to the neck of the occupant.

2. An assembly as claimed in claim 1 wherein a portion of the bladder is destroyed by the means for promptly evacuating the pressure.

3. An assembly as claimed in claim 1 wherein the headrest is formed with a flexible container filled with absorbing material to absorb the energy of the occupant's head as it is engaged by the head of the occupant.

4. An assembly as claimed in claim 3 wherein the absorbing material is buckwheat husks.

5. An assembly as claimed in claim 3 wherein the absorbing material is irregular plastic particles.

6. An assembly as claimed in claim 1 wherein the means for destroying the portion of the bag is an electrically heated wire which melts the portion of the wall of the bag.

* * * * *